No. 681,530. Patented Aug. 27, 1901.
G. W. DAVIS & D. C. RIPLEY.
APPARATUS FOR FORMING STEMS ON ARTICLES OF GLASSWARE.
(Application filed May 29, 1900. Renewed July 12, 1901.)
(No Model.)
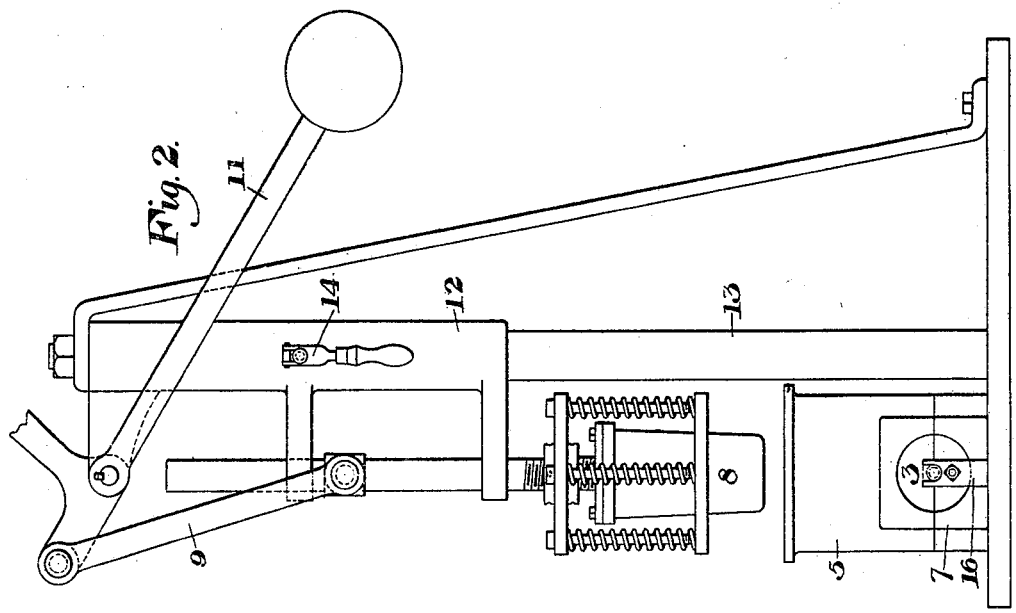
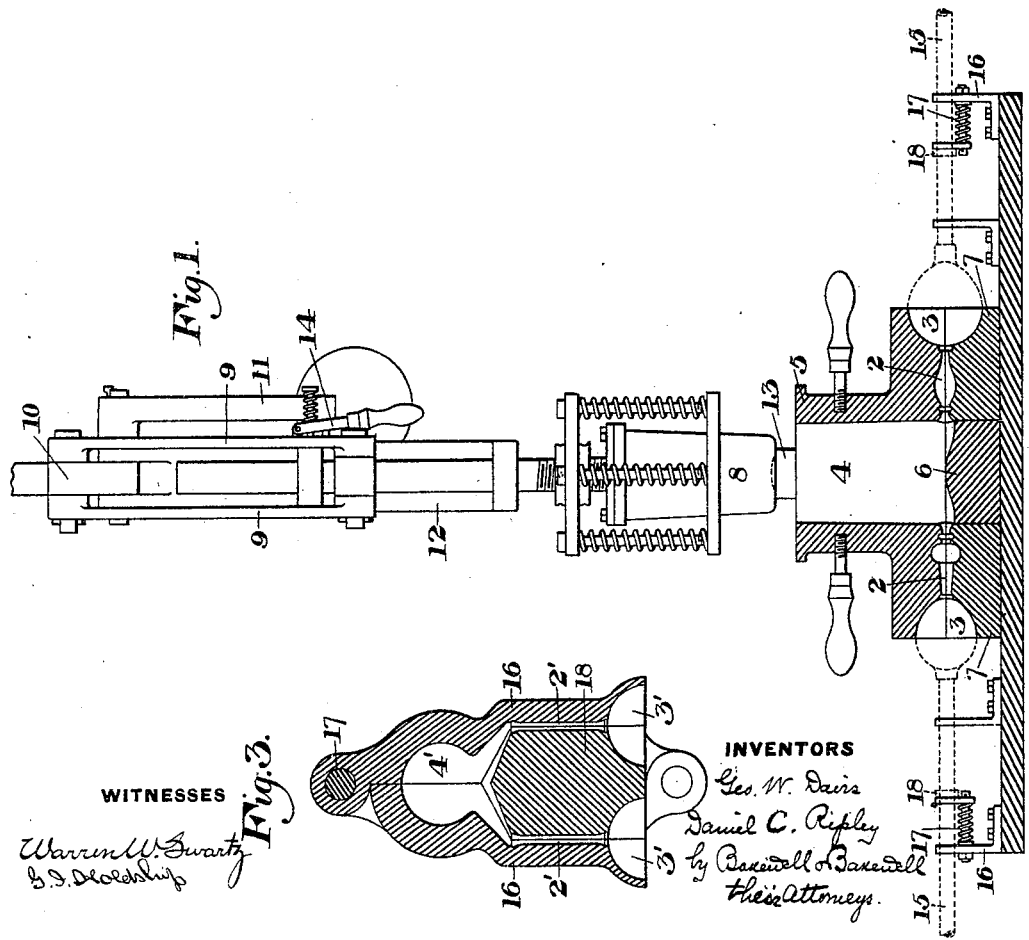
WITNESSES
Warren W Swartz
B. J. Dealership
INVENTORS
Geo. W. Davis
Daniel C. Ripley
by Bakewell & Bakewell
their Attorneys.
THE NORRIS PETERS CO., PHOTO-LITHO., WASHINGTON, D. C.

United States Patent Office.

GEORGE W. DAVIS, OF TIFFIN, OHIO, AND DANIEL C. RIPLEY, OF PITTSBURG, PENNSYLVANIA, ASSIGNORS TO THE UNITED STATES GLASS COMPANY, OF PITTSBURG, PENNSYLVANIA.

APPARATUS FOR FORMING STEMS ON ARTICLES OF GLASSWARE.

SPECIFICATION forming part of Letters Patent No. 681,530, dated August 27, 1901.

Application filed May 29, 1900. Renewed July 12, 1901. Serial No. 68,108. (No model.)

*To all whom it may concern:*

Be it known that we, GEORGE W. DAVIS, of Tiffin, Seneca county, Ohio, and DANIEL C. RIPLEY, of Pittsburg, in the county of Allegheny and State of Pennsylvania, have invented a new and useful Improvement in Apparatus for Forming Stems on Articles of Glassware, of which the following is a full, clear, and exact description, reference being had to the accompanying drawings, forming part of this specification, in which—

Figure 1 is a side elevation of the apparatus, showing the mold in vertical section. Fig. 2 is a side elevation. Fig. 3 shows in horizontal section a modified construction of mold.

The object of our invention is to provide efficient means for forming stems on articles of glassware and to cheapen and facilitate the cost of their manufacture.

The mold shown in Figs. 1 and 2 comprises one or more horizontal stem-cavities 2 2, communicating at the outer ends with open cavities 3 3, adapted to receive the bowls of the articles to which the stems are to be applied and communicating at the inner ends with a vertical fount-cavity 4. The cavity 4 is formed in a mold-section 5, preferably made in a single piece, and the cavity flares downwardly somewhat, so that at the end of the pressing operation the section may be raised vertically from the glass therein.

6 is the valve-section at the base of the cavity 4, and 7 is a mold-section under the section 5, in which the stem-cavities are partly formed.

8 is the plunger, connected by a link 9 with an operating bell-crank lever 10, having a counterbalancing-arm 11. The lever 10 is pivoted to a frame 12, which is rotatably mounted on a standard 13 and is provided with a latch 14, enabling it to be held so as to center the plunger above the mold or to be released and swung laterally.

The operation is as follows: The parts being in the positions shown in the drawings, the bowls to be fitted with open stems are placed in the cavities 3 3, the blowpipes 15, to which the bowls are fixed, being upheld and centered by supports 16. These supports may be provided with springs 17, adapted to bear against shoulders 18 on the pipes, so as to hold the bowls in place in their cavities. A gathering of glass being placed in the fount-cavity 4 and the plunger 8 being forced thereinto, the glass is displaced into the stem-cavities 2, forming the stems and causing them to weld to the bowls. The plunger 8 is of somewhat less diameter than the cavity 4, so that if any surplus of glass is fed to the fount-cavity it will not affect the stems injuriously, but will simply rise slightly around the plunger. This will relieve over-pressure on the stems. After the stems have thus been pressed the plunger 8 is raised and the frame carrying the plunger is swung to one side. The workman then lifts the mold-section 5, leaving the fount of glass fixed to the stems. The fount is then cracked off from the stems, and the stemmed articles can then be removed, the feet applied to them, and the bowls cracked off from the pipes and finished in any usual way. The whole operation is rapid and easy, and by using a number of stem-cavities several articles may be fitted with stems at one operation.

In Fig. 3 we show a modification of our invention in which the fount-cavity is formed in an open and shut mold, the sections 16 16 of which are hinged at 17 and have in them also the stem-cavities 2' 2' and the open-bowl cavities 3' 3'. A fixed section 18 coöperates with the hinged sections to make up the mold. With this form of our improved device after the bowls have been centered in the cavities 3' 3' and the stems pressed from the fount and welded to the bowls the mold can be opened on its hinge, the stems cracked off from the fount, as before, and the articles removed.

Other modifications of our invention will be suggested to those skilled in the art by inspection of the molds shown in the drawings, since

What we claim is—

1. Apparatus for forming stems on glassware, comprising a mold having a vertical fount-cavity, and a horizontal stem-cavity communicating therewith and having at its outer end an open portion to receive a previously-formed bowl, substantially as described.

2. Apparatus for forming stems on glassware, comprising a mold having a vertical fount-cavity, and a plurality of stem-cavities communicating therewith and having at their outer ends open portions to receive previously-formed bowls, substantially as described.

3. Apparatus for forming stems on glassware, comprising a mold having a vertical fount-cavity, a horizontal stem-cavity communicating therewith and having at its outer end an open portion adapted to receive a bowl, and means adapted to hold and center a blowpipe carrying said bowl; substantially as described.

4. Apparatus for forming stems on glassware, comprising a mold having a vertical fount-cavity, and a horizontal stem-cavity communicating therewith and having at its outer end an open portion adapted to receive a bowl, said fount-cavity flaring downwardly; substantially as described.

In testimony whereof we have hereunto set our hands.

GEORGE W. DAVIS.
DANIEL C. RIPLEY.

Witnesses as to George W. Davis:
HARRY TAGGART,
WILLIS BACON.

Witnesses as to Daniel C. Ripley:
H. M. CORWIN,
C. P. BYNES.